US012694887B2

(12) United States Patent
Kim

(10) Patent No.: US 12,694,887 B2
(45) Date of Patent: *Jul. 28, 2026

(54) MOBILE TERMINAL CAPABLE OF PROCESSING VOICE AND OPERATION METHOD THEREFOR

(71) Applicant: AMOSENSE CO., LTD., Cheonan-si (KR)

(72) Inventor: Jungmin Kim, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 272 days.

This patent is subject to a terminal disclaimer.

(21) Appl. No.: 18/034,626

(22) PCT Filed: Oct. 27, 2021

(86) PCT No.: PCT/KR2021/015161
§ 371 (c)(1),
(2) Date: Apr. 28, 2023

(87) PCT Pub. No.: WO2022/192790
PCT Pub. Date: May 5, 2022

(65) Prior Publication Data
US 2023/0377594 A1 Nov. 23, 2023

(30) Foreign Application Priority Data

Oct. 28, 2020 (KR) ........................ 10-2020-0141311

(51) Int. Cl.
*G10L 21/0272* (2013.01)
*G10L 15/00* (2013.01)
*H04R 5/027* (2006.01)

(52) U.S. Cl.
CPC ........ *G10L 21/0272* (2013.01); *G10L 15/005* (2013.01); *H04R 5/027* (2013.01); *H04R 2499/11* (2013.01)

(58) Field of Classification Search
CPC ... G10L 21/0272; G10L 15/005; G10L 15/26; G10L 2021/02166; H04R 5/027;
(Continued)

(56) References Cited

U.S. PATENT DOCUMENTS 9,749,738 B1 * 8/2017 Adsumilli .............. H04R 3/005
9,981,617 B1 * 5/2018 MacDonald ........ F02D 41/3005
(Continued)

FOREIGN PATENT DOCUMENTS

JP 4964204 B2 6/2012
JP 5339501 B2 11/2013
(Continued)

*Primary Examiner* — Thuykhanh Le
(74) *Attorney, Agent, or Firm* — Maschoff Brennan

(57) ABSTRACT

A mobile terminal is disclosed. The mobile terminal comprises: a microphone configured to generate a voice signal in response to voices of speakers; a processor configured to generate a separated voice signal associated with each of the voices by separating the voice signal from a sound source on the basis of a sound source location of each of the voices, and output the result of translation for each of the voices, on the basis of the separated voice signal; and a memory configured to store source language information indicating source languages that are uttered languages of the voices of the speakers. The processor outputs the results of translations in which the languages of the voices of the speakers have been translated from the source languages into a target language, on the basis of the source language information and the separated voice signal.

6 Claims, 6 Drawing Sheets

(58) Field of Classification Search

CPC .... H04R 2499/11; H04R 1/406; H04R 3/005; G06F 40/58; G06F 40/47; G01S 5/18

USPC .......................................................... 704/200

See application file for complete search history.

(56) References Cited

U.S. PATENT DOCUMENTS

| | | | |
|---|---|---|---|
| 10,091,599 B2 | 10/2018 | Lee et al. | |
| 10,491,998 B1* | 11/2019 | Kominar | H04R 3/12 |
| 11,397,280 B2* | 7/2022 | Nishimura | G06F 16/90335 |
| 11,495,222 B2 | 11/2022 | Han et al. | |
| 11,710,399 B1* | 7/2023 | Rothenberg | G08G 1/143 |
| | | | 340/988 |
| 11,900,072 B1* | 2/2024 | Bossio | G06F 3/04883 |
| 2001/0037203 A1* | 11/2001 | Satoh | G01C 21/36 |
| | | | 704/257 |
| 2002/0019213 A1* | 2/2002 | Yoshinori | B60H 1/00742 |
| | | | 454/155 |
| 2005/0267647 A1* | 12/2005 | Kamdar | G06F 40/58 |
| | | | 701/1 |
| 2007/0242834 A1* | 10/2007 | Coutinho | H04R 5/04 |
| | | | 381/71.8 |
| 2008/0250054 A1* | 10/2008 | Nickel | G06F 16/217 |
| | | | 707/999.102 |
| 2008/0318518 A1* | 12/2008 | Coutinho | H04H 20/62 |
| | | | 455/3.06 |
| 2012/0035923 A1* | 2/2012 | Krause | H04L 51/214 |
| | | | 704/235 |
| 2012/0265529 A1* | 10/2012 | Nachtrab | G06F 40/58 |
| | | | 704/235 |
| 2013/0144595 A1* | 6/2013 | Lord | G06F 40/58 |
| | | | 704/2 |
| 2013/0154852 A1* | 6/2013 | Kim | B60Q 5/006 |
| | | | 340/904 |
| 2013/0211818 A1* | 8/2013 | Sakamoto | G06F 40/58 |
| | | | 704/2 |
| 2014/0198933 A1* | 7/2014 | Totsuka | G06V 20/56 |
| | | | 381/302 |
| 2014/0206308 A1* | 7/2014 | Hatton | H04W 4/90 |
| | | | 455/404.1 |
| 2014/0310595 A1* | 10/2014 | Acharya | G06F 3/011 |
| | | | 715/706 |
| 2014/0365126 A1* | 12/2014 | Vulcano | G01C 21/3617 |
| | | | 701/538 |
| 2014/0365221 A1* | 12/2014 | Ben-Ezra | G10L 15/25 |
| | | | 704/256.1 |
| 2015/0105976 A1* | 4/2015 | Shikii | G06F 3/04817 |
| | | | 701/36 |
| 2015/0154957 A1* | 6/2015 | Nakadai | G10L 15/26 |
| | | | 704/235 |
| 2015/0189438 A1* | 7/2015 | Hampiholi | H04S 3/002 |
| | | | 381/80 |
| 2015/0204965 A1* | 7/2015 | Magarida | G01S 5/26 |
| | | | 367/117 |
| 2015/0347399 A1* | 12/2015 | Aue | H04M 3/42 |
| | | | 704/2 |
| 2016/0085747 A1* | 3/2016 | Kamatani | G06F 40/58 |
| | | | 704/277 |
| 2016/0097928 A1* | 4/2016 | Muramatsu | B60K 35/80 |
| | | | 345/7 |
| 2016/0127827 A1* | 5/2016 | Tzirkel-Hancock | H04R 3/002 |
| | | | 381/71.4 |
| 2016/0165031 A1* | 6/2016 | Gopinath | H04W 8/005 |
| | | | 455/569.2 |
| 2016/0350286 A1* | 12/2016 | Murthy | G06V 20/63 |
| 2017/0116186 A1* | 4/2017 | Usami | G06F 40/263 |
| 2017/0270080 A1* | 9/2017 | Sakamoto | G06F 40/106 |
| 2017/0293611 A1* | 10/2017 | Tu | G06F 16/9535 |
| 2017/0315990 A1* | 11/2017 | Kawana | G06F 40/58 |
| 2017/0317706 A1* | 11/2017 | Kudo | H04R 1/40 |
| 2018/0063632 A1* | 3/2018 | Wheeler | H04R 1/2811 |
| 2018/0124515 A1* | 5/2018 | Lopez | G06F 3/165 |
| 2018/0137103 A1* | 5/2018 | Watson | G09B 21/006 |
| 2018/0319333 A1* | 11/2018 | Schindele | H04R 1/025 |
| 2019/0018411 A1* | 1/2019 | Herbach | G06V 20/593 |
| 2019/0020923 A1* | 1/2019 | Joye | H04N 21/42201 |
| 2019/0035418 A1* | 1/2019 | Takashima | G10L 21/0272 |
| 2019/0045319 A1* | 2/2019 | Hotary | G06V 20/59 |
| 2019/0095430 A1* | 3/2019 | Smus | G06F 40/58 |
| 2019/0130931 A1* | 5/2019 | Costa | G10L 21/10 |
| 2019/0139563 A1* | 5/2019 | Chen | G06N 3/084 |
| 2019/0180758 A1* | 6/2019 | Washio | G10L 15/26 |
| 2019/0273767 A1* | 9/2019 | Nelson | H04M 7/0027 |
| 2019/0315227 A1* | 10/2019 | Kim | G09B 21/009 |
| 2019/0378515 A1* | 12/2019 | Kim | G10L 17/22 |
| 2020/0098356 A1 | 3/2020 | Kim et al. | |
| 2020/0107119 A1* | 4/2020 | Shioda | H04R 1/083 |
| 2020/0193817 A1* | 6/2020 | Hwang | B60K 31/0008 |
| 2020/0202884 A1* | 6/2020 | Phan Le | H04W 4/02 |
| 2020/0217919 A1 | 7/2020 | Eronen et al. | |
| 2020/0260142 A1* | 8/2020 | Kasahara | H04N 21/4532 |
| 2020/0293585 A1* | 9/2020 | Pasternack | G06F 40/232 |
| 2020/0349949 A1* | 11/2020 | Yoshioka | G10L 15/26 |
| 2020/0349953 A1* | 11/2020 | Qin | G10L 15/26 |
| 2020/0381008 A1* | 12/2020 | Matsumoto | H04R 1/406 |
| 2020/0387676 A1* | 12/2020 | Kim | G10L 15/16 |
| 2021/0001781 A1* | 1/2021 | Hwang | H04R 25/558 |
| 2021/0133290 A1* | 5/2021 | Makke | G10L 15/22 |
| 2021/0204059 A1* | 7/2021 | Trestain | H04R 3/005 |
| 2021/0248994 A1* | 8/2021 | Hori | G06F 3/167 |
| 2021/0295821 A1* | 9/2021 | Shin | G06F 3/167 |
| 2021/0306789 A1* | 9/2021 | Noguchi | H04R 1/403 |
| 2021/0375261 A1* | 12/2021 | Swvigaradoss | G10L 13/086 |
| 2022/0027579 A1* | 1/2022 | Suzuki | G10L 15/25 |
| 2022/0066207 A1* | 3/2022 | Croxford | G06V 40/20 |
| 2022/0222451 A1* | 7/2022 | Shin | G10L 15/04 |
| 2022/0277744 A1* | 9/2022 | Mohammad | G10L 21/02 |
| 2023/0067132 A1* | 3/2023 | Ochiai | G10L 25/93 |
| 2023/0173921 A1* | 6/2023 | Ushio | B60K 35/60 |
| | | | 701/36 |
| 2023/0186036 A1* | 6/2023 | Choi | G10L 21/04 |
| | | | 704/200 |
| 2023/0224981 A1* | 7/2023 | Kim | H04W 12/50 |
| 2023/0267942 A1* | 8/2023 | Efros | G10L 21/0208 |
| | | | 704/226 |
| 2023/0352025 A1* | 11/2023 | Chen | G10L 15/22 |

FOREIGN PATENT DOCUMENTS

| | | |
|---|---|---|
| JP | 5724125 B2 | 5/2015 |
| KR | 10-1889809 B1 | 8/2018 |
| KR | 10-2018-0131155 A | 12/2018 |
| KR | 10-1983310 B1 | 5/2019 |
| KR | 10-2019-0140589 A | 12/2019 |
| KR | 10-2020-0033707 A | 3/2020 |
| KR | 10-2127640 B1 | 6/2020 |
| KR | 10-2020-0083685 A | 7/2020 |
| WO | 2019/124742 A1 | 6/2019 |

* cited by examiner

[FIG. 1]
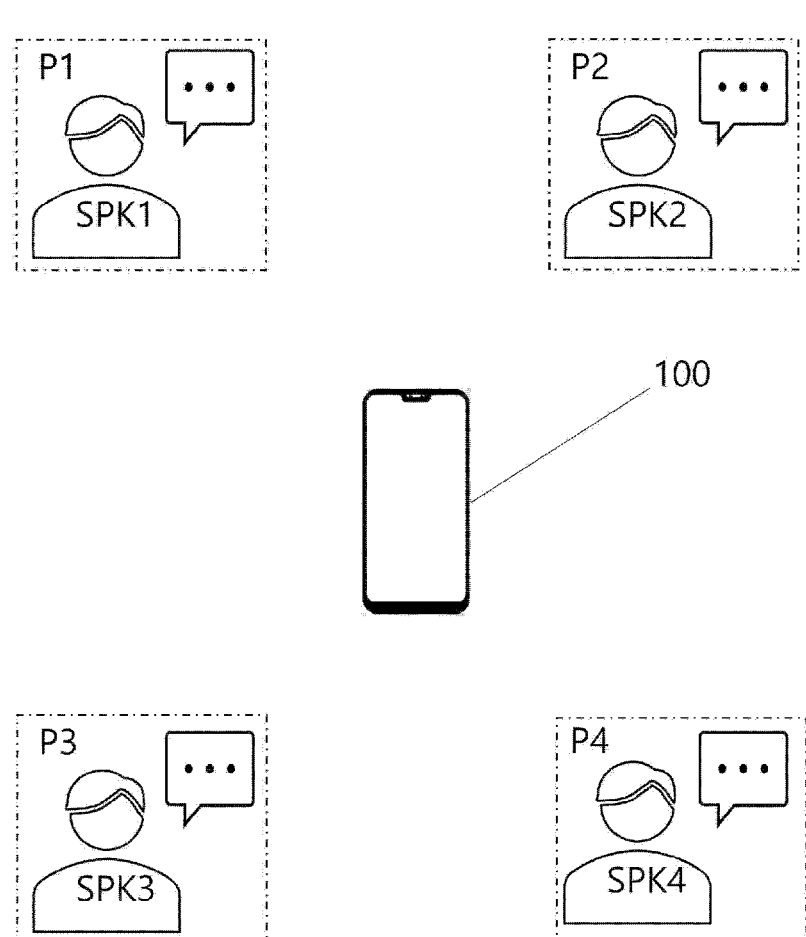

[FIG. 2]
100
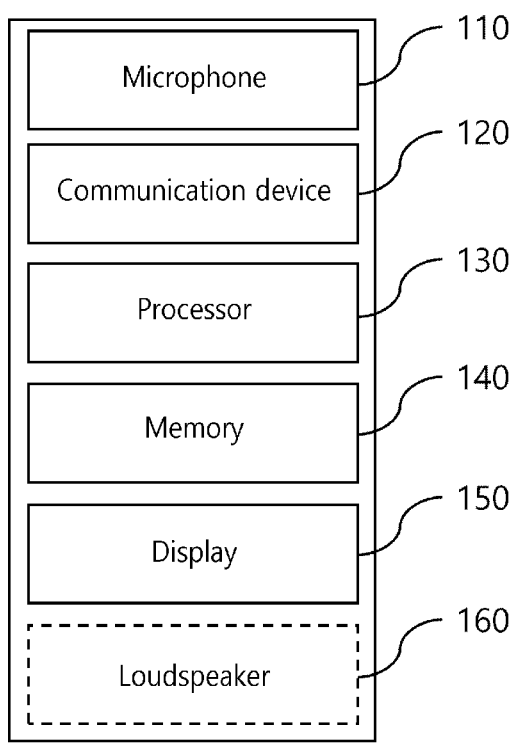

[FIG. 3]
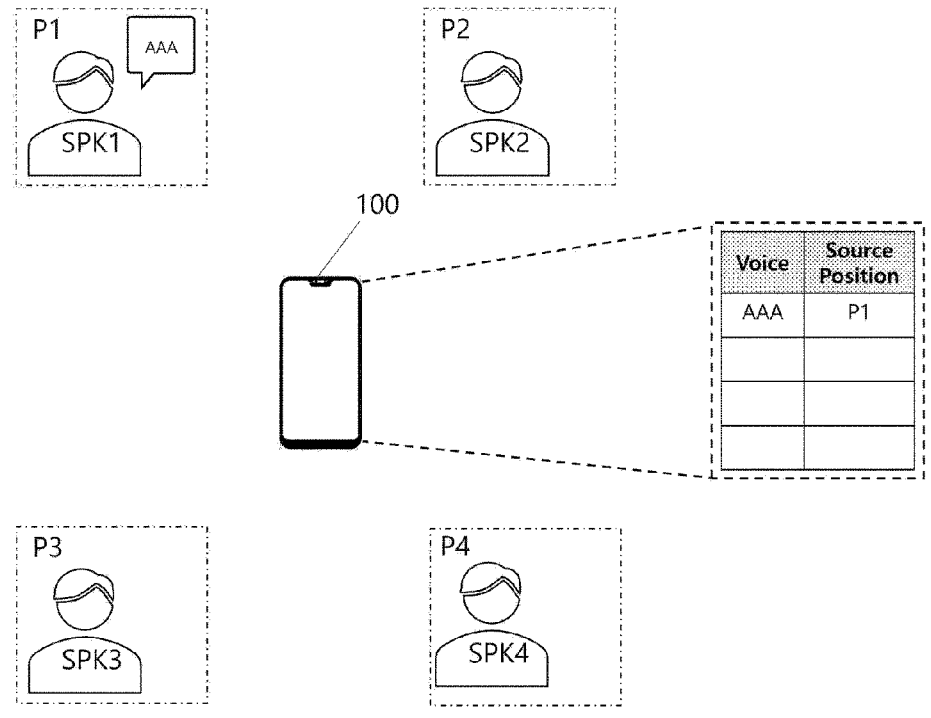
[FIG. 4]
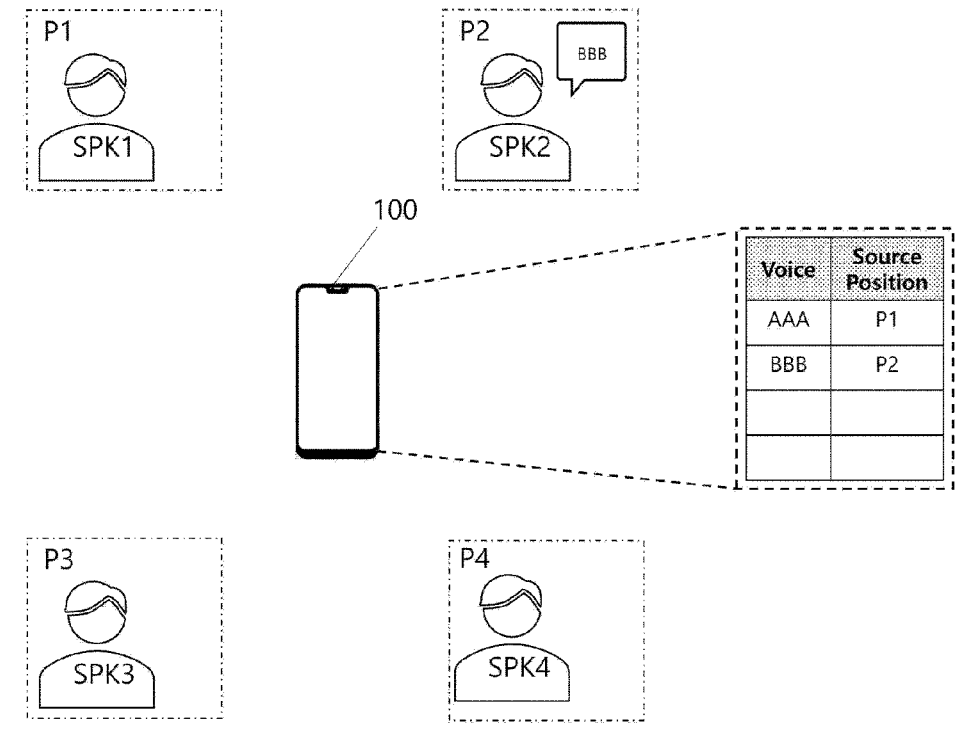

[FIG. 5]
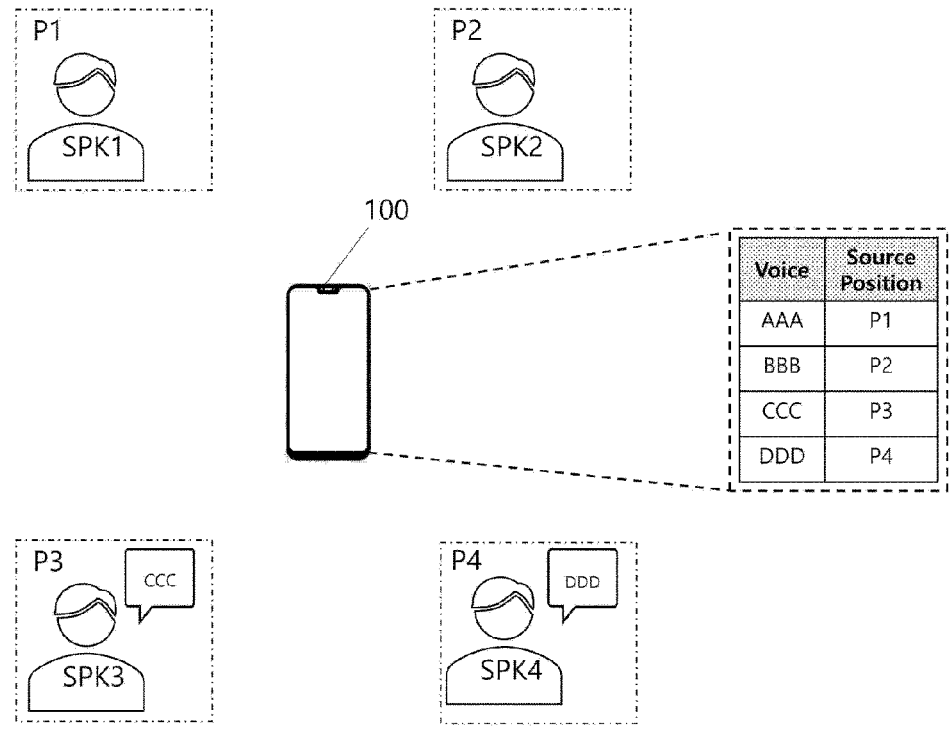
[FIG. 6]
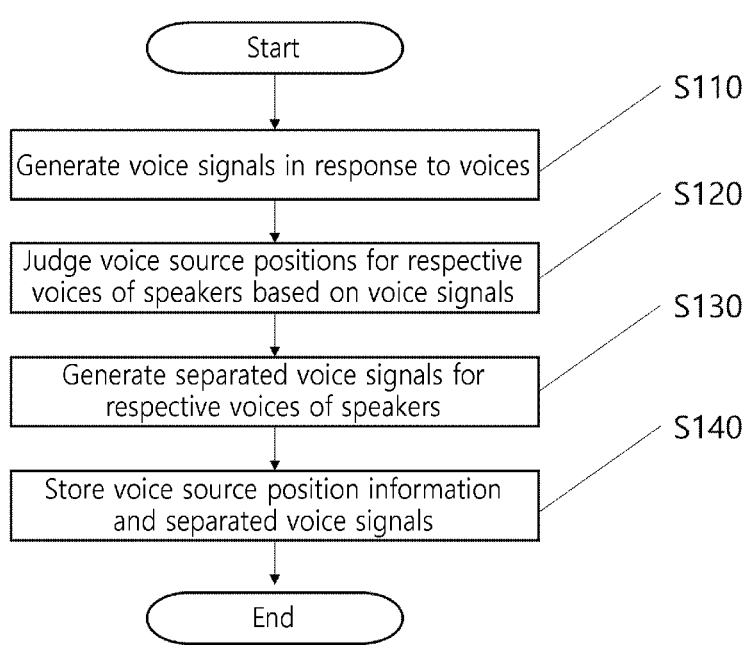

[FIG. 7]
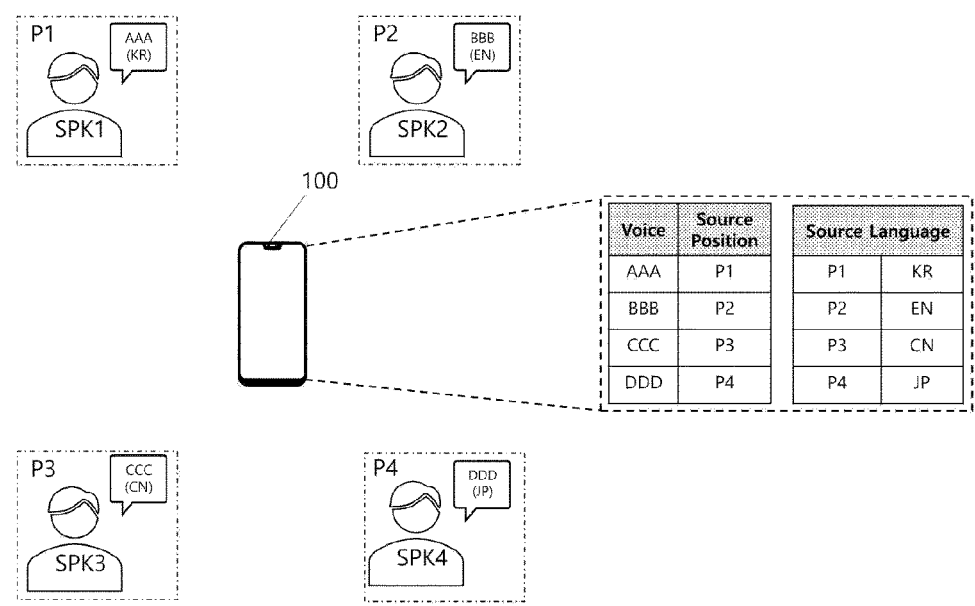
[FIG. 8]
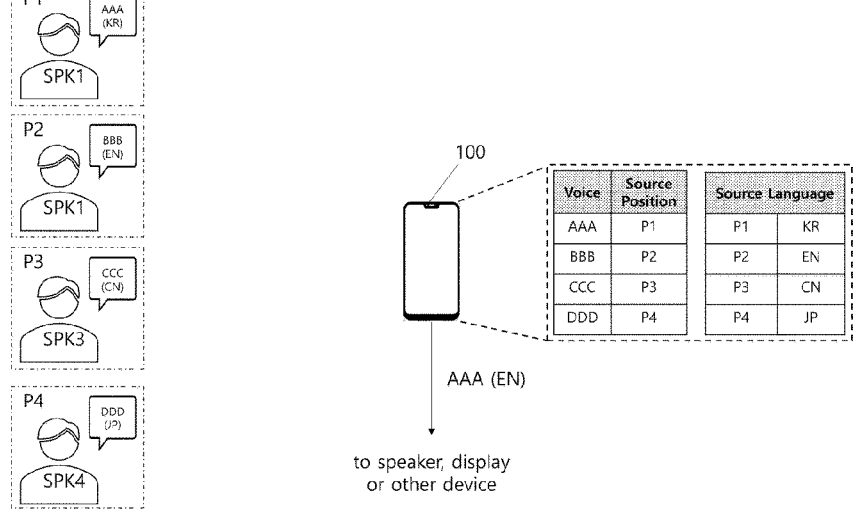

[FIG. 9]
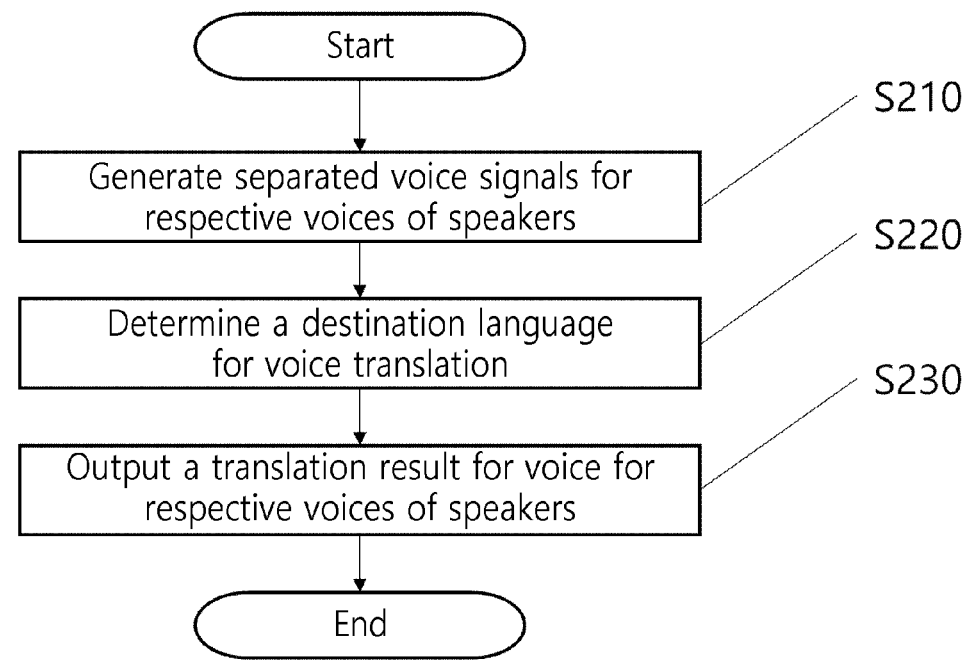

MOBILE TERMINAL CAPABLE OF PROCESSING VOICE AND OPERATION METHOD THEREFOR

TECHNICAL FIELD

Embodiments of the present disclosure relate to a mobile terminal capable of processing voice and an operation method of the same.

BACKGROUND ART

A microphone is a device which converts voice into a voice signal that is an electrical signal. In case that a microphone is disposed in a space in which a plurality of speakers are positioned, such as a meeting room or a classroom, the microphone receives all voices from the plurality of speakers, and generates voice signals related to the voices from the plurality of speakers.

Meanwhile, in case that the plurality of speakers pronounce at the same time, voices of the plurality of speakers may be all mixed. In this case, it is required to separate a voice signal representing the voice of a specific speaker among the voices of the plurality of speakers.

SUMMARY OF INVENTION

Technical Problem

An object of the present disclosure is to provide a mobile terminal, which can generate separated voice signals related to respective voices of speakers in response to the voices of the speakers.

Another object of the present disclosure is to provide a mobile terminal, which can generate translation results for the respective voices of the speakers by using the separated voice signals related to the respective voices of the speakers, and output the generated translation results.

Solution to Problem

A mobile terminal according to embodiments of the present disclosure includes: a microphone configured to generate voice signals in response to voices of speakers; a processor configured to generate separated voice signals related to the respective voices by performing voice source separation of the voice signals based on respective voice source positions of the voices, and output translation results for the respective voices based on the separated voice signals; and a memory configured to store source language information representing source languages that are pronounced languages of the voices of the speakers, wherein the processor is configured to output the translation results in which the languages of the voices of the speakers have been translated from the source languages into target languages to be translated based on the source language information and the separated voice signals.

An operation method of a mobile terminal capable of processing voices according to embodiments of the present disclosure includes: generating voice signals in response to voices of speakers; performing voice source separation of the voice signals based on respective voice source positions of the voices; generating separated voice signals related to the respective voices in accordance with the result of the voice source separation; and outputting translation results for the respective voices based on the separated voice signals, wherein the outputting of the translation results includes: storing source language information representing source languages that are pronounced languages of the voices of the speakers; and outputting the translation results in which the languages of the voices of the speakers have been translated from the source languages into target languages that are languages to be translated based on the source language information and the separated voice signals.

Advantageous Effects of Invention

The mobile terminal according to embodiments of the present disclosure has the effect of being able to generate the voice signals having the minimized effect of surrounding noises since the mobile terminal can generate the separated voice signals related to the voices from the specific voice source positions based on the voice source positions of the voices.

The mobile terminal according to embodiments of the present disclosure has the effect of not only being able to extract the voices of the respective speakers from the transmitted voice signals but also being able to judge the source languages that are the languages before translating the voices based on the voice source positions of the voices, and being able to provide the translation results by translating the corresponding voices based on the judged source languages.

BRIEF DESCRIPTION OF DRAWINGS

FIG. 1 is a diagram illustrating a voice processing environment according to embodiments of the present disclosure.

FIG. 2 illustrates a mobile terminal according to embodiments of the present disclosure.

FIGS. 3 to 5 are diagrams explaining an operation of a mobile terminal according to embodiments of the present disclosure.

FIG. 6 is a flowchart illustrating an operation method of a mobile terminal according to embodiments of the present disclosure.

FIG. 7 is a diagram explaining a translation function of a voice processing device according to embodiments of the present disclosure.

FIG. 8 is a diagram explaining a translation function of a mobile terminal according to embodiments of the present disclosure.

FIG. 9 is a flowchart illustrating an operation method of a mobile terminal according to embodiments of the present disclosure.

DESCRIPTION OF EMBODIMENTS

Hereinafter, embodiments of the present disclosure will be described with reference to the accompanying drawings.

FIG. 1 is a diagram illustrating a voice processing environment according to embodiments of the present disclosure. Referring to FIG. 1, speakers SPK1 to SPK4 may be positioned in a space (e.g., meeting room, vehicle, or lecture room) and pronounce voices. According to embodiments, the first speaker SPK1 may pronounce the voice at a first position P1, the second speaker SPK2 may pronounce the voice at a second position P2, the third speaker SPK3 may pronounce the voice at a third position P3, and the fourth speaker SPK4 may pronounce the voice at a fourth position P4.

The mobile terminal 100 is a portable electronic device, and may be an electronic device having a communication function and a calculation processing function. For example, the mobile terminal 100 may be a smartphone, a laptop, a personal digital assistance (PDA), a wearable device, a smart watch, or a tablet computer, but the embodiments of the present disclosure are not limited thereto.

The mobile terminal 100 may perform voice processing for the voices of the respective speakers SPK1 to SPK4 by processing voice signals related to the voices of the speakers SPK1 to SPK4.

The mobile terminal 100 may generate the voice signals related to the voices of the speakers SPK1 to SPK4 in response to the voices of the respective speakers SPK1 to SPK4. The voice signals are signals related to the voices pronounced for a specific time, and may be signals representing the voices of the plurality of speakers.

According to an embodiment, the mobile terminal 100 may extract (or generate) separated voice signals related to the voices of the speakers SPK1 to SPK4 by judging voice source positions of the respective voices of the speakers SPK1 to SPK4 by using the voice signals related to the voices of the speakers SPK1 to SPK4, and performing voice source separation based on the voice source positions.

That is, the mobile terminal 100 may generate the separated voice signals related to the voices of the speakers SPK1 to SPK4 positioned at respective positions P1 to P4 based on the voice source positions of the voices corresponding to the voice signals. For example, the mobile terminal 100 may generate a first separated voice signal related to the voice of the first speaker SPK1 who has pronounced at the first position P1 based on the voice signals. In this case, the first separated voice signal may be the voice signal having the highest correlation to the voice of the first speaker SPK1 among the voices of the speakers SPK1 to SPK4. In other words, the voice component of the first speaker SPK1 among the voice components included in the first separated voice signal may have the greatest importance.

Further, the mobile terminal 100 may provide translations for the voices of the speakers SPK1 to SPK4. For example, the mobile terminal 100 may determine source languages (translation target languages) for translating the voices of the respective speakers SPK1 to SPK4 and target languages (languages after translation), and provide the translations for the languages of the respective speakers by using the separated voice signals.

According to embodiments, the mobile terminal 100 may output translation results for the voices. The translation results may be text data or voice signals related to the voices of the respective speakers SPK1 to SPK4 expressed in the target languages.

That is, since the mobile terminal 100 according to embodiments of the present disclosure determines the source languages and the target languages in accordance with the voice source positions of the respective voices of the speakers SPK1 to SPK4, it has the effect of being able to provide the translations for the voices of the speakers with less time and few resources without the necessity of identifying in what languages the voices of the speakers are.

FIG. 2 illustrates a mobile terminal according to embodiments of the present disclosure. Referring to FIG. 2, the mobile terminal 100 may include a microphone 110, a communication device 120, a processor 130, a memory 140, and a display 150. According to embodiments, the mobile terminal 100 may further include a loudspeaker 160.

The microphone 110 may generate voice signals in response to generated voices. According to embodiment, the microphone 110 may detect vibrations of air caused by the voices, and generate voice signals that are electrical signals corresponding to the vibrations in accordance with the detection results.

According to embodiments, a plurality of microphones 110 may be provided, and each of the plurality of microphones 110 may generate the voice signal in response to the voice. In this case, since the positions at which the plurality of microphones 110 are disposed may be different from one another, the voice signals generated from the respective microphones 110 may have different phase differences (or time delays).

The communication device 120 may exchange data with an external device in accordance with a wireless communication method. According to embodiments, the communication device 120 may exchange the data with the external device by using radio waves having various frequencies. For example, the communication device 120 may exchange the data with the external device in accordance with at least one of short-range wireless communication, middle-range wireless communication, and long-range wireless communication.

The processor 130 may control the overall operation of the mobile terminal 100. According to embodiments, the processor 130 may include a processor having a calculation processing function. For example, the processor 130 may include a central processing unit (CPU), a micro controller unit (MCU), a graphics processing unit (GPU), a digital signal processor (DSP), an analog to digital converter (ADC), or a digital to analog converter (DAC), but is not limited thereto.

The processor 130 may process voice signals generated by the microphone 110. For example, the processor 130 may convert analog type voice signals into digital type voice signals, and process the converted digital type voice signals. In this case, since the signal types (analog or digital) are changed, in explaining embodiments of the present disclosure, the digital type voice signals and the analog type voice signals will be interchangeably used.

According to embodiments, the processor 130 may extract (or generate) the separated voice signals related to the voices of the speakers SPK1 to SPK4 by using the voice signals generated by the microphone 110. According to embodiments, the processor 130 may generate the separated voice signals related to the voices of the speakers SPK1 to SPK4 positioned at the respective positions P1 to P4.

The processor 130 may determine the voice source positions (i.e., positions of the speakers SPK1 to SPK4) of the voices by using the time delay (or phase delay) between the voice signals. For example, the processor 130 may determine relative positions of the voice sources (i.e., speakers SPK1 to SPK4) against the mobile terminal 100.

The processor 130 may generate the separated voice signals related to the voices of the respective speakers SPK1 to SPK4 based on the determined voice source positions. For example, the processor 130 may generate the first separated voice signal related to the voice of the first speaker SPK1 based on the voice source positions of the voices.

According to embodiments, the processor 130 may match and store, in the memory 140, the first separated voice signal related to the voice of the first speaker SPK1 with the first voice source position information representing the voice source position of the voice of the first speaker SPK1.

The operation of the processor 130 or the mobile terminal 100 being described in the description may be implemented in the form of a program executable by a computing device. For example, the processor 130 may execute an application stored in the memory 140, and perform operations corresponding to instructions indicating specific operations in accordance with the execution of the application.

The memory 140 may store data required for the operation of the mobile terminal 100. For example, the memory 140 may include at least one of a nonvolatile memory and a volatile memory.

According to embodiments, the memory 140 may store identifiers corresponding to the respective positions P1 to P4 on space. The identifiers may be data for identifying the positions P1 to P4. Since the speakers SPK1 to SPK4 are positioned at the positions P1 to P4, respectively, the speakers SPK1 to SPK4 can be distinguished by using the identifiers corresponding to the positions P1 to P4. For example, the first identifier representing the first position P1 may directly indicate the first speaker SPK1.

The identifiers may be input through an input device (e.g., touchpad) of the mobile terminal 100.

According to embodiments, the memory 140 may store the voice source position information related to the positions of the respective speakers SPK1 to SPK4 and the separated voice signals related to the voices of the respective speakers SPK1 to SPK4.

The display 150 may visually display the data under the control of the processor 130. According to embodiments, the display 150 may include light emitting elements, and the light emitting elements may emit light of a specific wavelength in accordance with an electrical signal. For example, the display 150 may be a liquid crystal display (LCD), an organic light emitting diode (OLED) display, a flexible display, a micro LED display, or a quantum dot display, but the embodiments of the present disclosure are not limited thereto.

The loudspeaker 160 may vibrate under the control of the processor 130, and voices may be generated in accordance with the vibrations. According to embodiments, the loudspeaker 160 may reproduce the voices related to the voice signals through forming of vibrations corresponding to the voice signals.

FIGS. 3 to 5 are diagrams explaining an operation of a mobile terminal according to embodiments of the present disclosure. Referring to FIGS. 3 to 5, speakers SPK1 to SPK4 positioned at positions P1 to P4, respectively, may pronounce voices.

The mobile terminal 100 according to embodiments of the present disclosure may generate the separated voice signals related to the voices of the respective speakers SPK1 to SPK4 from the voices of the speakers SPK1 to SPK4, and store the separated voice signals and position information representing the respective positions of the speakers SPK1 to SPK4.

According to embodiments, the mobile terminal 100 may determine the voice source positions (i.e., positions of the speakers SPK1 to SPK4) of the voices by using a time delay (or phase delay) between the voice signals. For example, the mobile terminal 100 may determine relative positions of the voice sources (i.e., speakers SPK1 to SPK4) against the mobile terminal 100.

The mobile terminal 100 may generate the separated voice signals related to the voices of the respective speakers SPK1 to SPK4 based on the determined voice source positions.

As illustrated in FIG. 3, the first speaker SPK1 may pronounce voice "AAA". If the voice "AAA" is pronounced, the mobile terminal 100 may generate the voice signal related to the voice "AAA" in response to the voice "AAA". According to embodiments, the voice signal related to the voice "AAA" may also include components related to noises except the voice "AAA".

According to embodiments, the mobile terminal 100 may generate the separated voice signal related to the voice "AAA" of the first speaker SPK1 by using the generated voice signal. In this case, the mobile terminal 100 may store the first separated voice signal related to the voice "AAA" of the first speaker SPK1 and the first voice source position information representing the first position P1 that is the position of the first speaker SPK1 in the memory 140. For example, as illustrated in FIG. 3, the first separated voice signal and the first voice source position information may be matched with each other and stored.

As illustrated in FIG. 4, the second speaker SPK2 may pronounce voice "BBB". If the voice "BBB" is pronounced, the mobile terminal 100 may generate the voice signal related to the voice "BBB" in response to the voice "BBB".

According to embodiments, the mobile terminal 100 may generate the second separated voice signal related to the voice "BBB" of the second speaker SPK2 by using the generated voice signal. In this case, the mobile terminal 100 may store the second separated voice signal related to the voice "BBB" of the second speaker SPK2 and the second voice source position information representing the second position P2 that is the position of the second speaker SPK2 in the memory 140. For example, as illustrated in FIG. 4, the second separated voice signal and the second voice source position information may be matched with each other and stored.

As illustrated in FIG. 5, the third speaker SPK3 may pronounce voice "CCC", and the fourth speaker SPK4 may pronounce voice "DDD". The mobile terminal 100 may generate the voice signals related to the voice "CCC" and the voice "DDD" in response to the voice "CCC" and the voice "DDD". That is, the voice signals are voice signals including components related to the voice "CCC" and the voice "DDD".

According to embodiments, the mobile terminal 100 may generate the third separated voice signal related to the voice "CCC" of the third speaker SPK3 and the fourth separated voice signal related to the voice "DDD" of the fourth speaker SPK4 by using the generated voice signals.

In this case, the mobile terminal 100 may store the third separated voice signal related to the voice "CCC" of the third speaker SPK3 and the third position information representing the third position P3 that is the position of the third speaker SPK3 in the memory 140. Further, the mobile terminal 100 may store the fourth separated voice signal related to the voice "DDD" of the fourth speaker SPK4 and the fourth position information representing the fourth position P4 that is the position of the fourth speaker SPK4 in the memory 140.

For example, as illustrated in FIG. 4, the third separated voice signal and the third voice source position information may be matched with each other and stored, and the fourth separated voice signal and the fourth voice source position information may be matched with each other and stored.

That is, the mobile terminal 100 according to embodiments of the present disclosure may generate the separated voice signals related to the voices of the respective speakers SPK1 to SPK4 from the voices of the speakers SPK1 to SPK4, and store the position information representing the positions of the respective speakers SPK1 to SPK4.

FIG. 6 is a flowchart illustrating a voice separation method of a mobile terminal according to embodiments of the present disclosure. An operation method of a mobile terminal to be explained with reference to FIG. 6 may be implemented as an application (e.g., voice separation application) which is stored in a non-temporary storage medium, and is executable by a computing device. For example, the processor 130 may execute an application stored in the memory 140, and perform operations corresponding to instructions indicating specific operations in accordance with the execution of the application.

Referring to FIG. 6, the mobile terminal 100 may generate the voice signals in response to the voices (S110). According to embodiments, the mobile terminal 100 may convert voices detected in a space into voice signals that are electrical signals.

The mobile terminal 100 may judge the voice source positions (i.e., positions of the speakers SPK1 to SPK4) for the respective voices by using the voice signals related to the voices of the speakers SPK1 to SPK4 (S120). According to embodiments, the mobile terminal 100 may generate the voice source position information representing the voice source positions (i.e., positions of the speakers SPK1 to SPK4) for the respective voices of the speakers SPK1 to SPK4.

The mobile terminal 100 may generate the separated voice signals related to the respective voices of the speakers SPK1 to SPK4 based on the voice source positions for the voices (S130). According to embodiments, the mobile terminal 100 may generate the separated voice signals related to the respective voices of the speakers SPK1 to SPK4 by separating the generated voice signals based on the voice source positions of the respective voices. For example, the mobile terminal 100 may generate the separated voice signals related to the respective voices of the speakers SPK1 to SPK4 by separating the components included in the voice signals based on the voice source positions.

The mobile terminal 100 may store the voice source position information representing the voice source positions and the separated voice signals (S140). According to embodiments, the mobile terminal 100 may match and store the voice source position information representing the voice source positions with the separated voice signals related to the voices of the respective speakers SPK1 to SPK4. For example, the mobile terminal 100 may match and store the data corresponding to the separated voice signals related to the voices of the respective speakers SPK1 to SPK4 with the voice source position information.

According to embodiments, the mobile terminal 100 (or processor 130) according to embodiments of the present disclosure may generate (or separate) the separated voice signals related to the voices of the respective speakers SPK1 to SPK4 from the voice signals related to the voices of the speakers SPK1 to SPK4 by executing an application (e.g., voice separation application) stored in the memory 140.

Generally, in order to perform processing of the voice signals, hardware, such as the microphone and the processor configured to process the voice signals, is required. Meanwhile, since the mobile terminal, such as a smartphone, basically includes the loudspeaker and the processor, users can perform the method according to embodiments of the present disclosure by using the mobile terminal 100, so that the mobile terminal 100 has the effect of being able to separate the voices of the speakers even without preparing the separate hardware. For example, the processor 130 of the mobile terminal 100 may execute the voice separation application, and perform the voice separation by using the hardware (e.g., loudspeaker) included in the mobile terminal 100. FIG. 7 is a diagram explaining a translation function of a mobile terminal according to embodiments of the present disclosure. Referring to FIG. 7, the first speaker SPK1 pronounces the voice "AAA" in Korean (KR), the second speaker SPK2 pronounces the voice "BBB" in English (EN), the third speaker SPK3 pronounces the voice "CCC" in Chinese (CN), and the fourth speaker SPK4 pronounces the voice "DDD" in Japanese (JP).

The mobile terminal 100 according to embodiments of the present disclosure may generate the separated voice signals related to the voices of the respective speakers SPK1 to SPK4 from the voices of the speakers SPK1 to SPK4, and provide translations for the voices of the respective speakers SPK1 to SPK4. In this case, the mobile terminal 100 may determine source languages of the voices of the speakers SPK1 to SPK4 by using source language information corresponding to the positions of the respective speakers SPK1 to SPK4, and provide translations for the voices.

As illustrated in FIG. 7, the mobile terminal may store the separated voice signals related to the voices of the respective speakers SPK1 to SPK4, the voice source position information representing the positions of the speakers SPK1 to SPK4, and source language information representing source languages of the voices of the respective speakers SPK1 to SPK4. In this case, the source languages may be predetermined and stored for each voice source position.

For example, the mobile terminal 100 may store first source language information representing that the source language corresponding to the first position P1 is "KR" in the memory 140. Further, the mobile terminal 100 may store the first separated voice signal related to the voice "AAA" of the first speaker SPK1, first voice source position information representing the first position P1 that is the position of the first speaker SPK1, and the first source language information representing "KR" that is the source language of the voice "AAA (KR)" of the first speaker SPK1 in the memory 140.

According to embodiments, if the speakers SPK1 to SPK4 pronounce the voices, the mobile terminal 100 may generate the separated voice signals related to the voices of the respective speakers SPK1 to SPK4 and the voice source position information representing the positions of the speakers SPK1 to SPK4 in response to the voices of the speakers SPK1 to SPK4.

The mobile terminal 100 may determine the source languages corresponding to the respective separated voice signals, and provide the translations for the voices of the speakers SPK1 to SPK4 based on the determined source languages. According to an embodiment, the mobile terminal 100 may determine the source languages corresponding to the voice source positions of the respective voices, and generate the translation results for the separated voice signals based on the determined source languages.

For example, the mobile terminal 100 may convert the separated voice signal into text data (e.g., speech-to-text (STT) conversion), generate the translation result from the source language to a target language with respect to the converted text data, and convert the translation result into a voice signal (e.g., text-to-speech (TTS) conversion). That is, the translation results mentioned in the description may mean all of the text data or voice signals related to the voices of the respective speakers SPK1 to SPK4 expressed in the target language.

According to embodiments, the mobile terminal 100 may output the generated translation result. For example, the mobile terminal 100 may output the generated translation result through the display 150, output the generated translation result through the loudspeaker 160, or transmit the generated translation result to another external device.

FIG. 8 is a diagram explaining a translation function of a mobile terminal according to embodiments of the present disclosure. Referring to FIG. 8, the mobile terminal 100 may generate the separated voice signals related to the voices of the respective speakers SPK1 to SPK4, and output the translation results for the voices of the respective speakers SPK1 to SPK4. In this case, the translation results represent the results of converting the languages of the voices of the speakers SPK1 to SPK4 from the source languages into other languages (e.g., target languages).

As illustrated in FIG. 8, the first speaker SPK1 pronounces the voice "AAA" in Korean (KR), and the second speaker SPK2 pronounces the voice "BBB" in English (EN). In this case, the source language of the voice "AAA" of the first speaker SPK1 becomes Korean (KR), and the source language of the voice "BBB" of the second speaker SPK2 becomes English (EN).

The mobile terminal 100 may determine the voice source position (e.g., P1) of the first speaker SPK1 in response to the voice "AAA (KR)" of the first speaker SPK1, and generate the first separated voice signal related to the voice "AAA (KR)" of the first speaker SPK1 based on the voice source position. In the same manner, the mobile terminal 100 may determine the voice source position (e.g., P2) of the second speaker SPK2 in response to the voice "BBB (EN)" of the second speaker SPK2, and generate the second separated voice signal related to the voice "BBB (EN)" of the second speaker SPK2 based on the voice source position.

The mobile terminal 100 may provide the translations for the languages of the voices of the speakers SPK1 to SPK4 from the source languages to the target languages by using the generated separated voice signals. According to embodiments, the mobile terminal 100 may determine the source languages that are determined in accordance with the voice source positions of the voices of the speakers SPK1 to SPK4 by using the source language information stored in the memory 140, and output the translation results for the languages of the voices of the respective speakers SPK1 to SPK4 from the source languages to the target languages in accordance with the determined source languages.

According to embodiments, the mobile terminal 100 may store the target language information representing the target languages for the respective positions, and determine the target languages corresponding to the voice source positions of the voices of the respective speakers SPK1 to SPK4 by using the stored target language information. Further, according to embodiments, the mobile terminal 100 may determine the target languages for the voices of the respective speakers SPK1 to SPK4 based on an input from the user.

For example, the mobile terminal 100 may read the first source language information corresponding to the first position P1 from the memory 140 by using the first voice source position information representing the first position P1 that is the voice source position of the voice "AAA (KR)" of the first speaker SPK1. The read first source language information may indicate that the source language of the voice "AAA" of the first speaker SPK1 is Korean (KR).

The translation results may be output through the display 150 or the loudspeaker 160, may be stored in the memory 140, or may be transmitted to an external device through the communication device 120.

In the description, the translation result that is output by the mobile terminal 100 may be text data expressed in the target language or a voice signal related to the voice pronounced in the target language, but is not limited thereto.

In the description, the generation of the translation results by the mobile terminal 100 includes not only generation of the translation results by translating the languages through calculation of the processor 130 itself of the mobile terminal 100 but also generation of the translation results by receiving the translation results from a server having a translation function through communication with the server.

For example, the processor 130 may generate the translation results for the voices of the respective speakers SPK1 to SPK4 by executing the translation application stored in the memory 140.

For example, the mobile terminal 100 may transmit the separated voice signals, the source language information, and the target language information to translators, and receive the translation results for the separated voice signals from the translators. The translators may mean an environment or a system that provides the translations for the languages. According to embodiments, the translators may output the translation results for the voices of the respective speakers SPK1 to SPK4 by using the separated voice signals, the source language information, and the target language information.

For example, as illustrated in FIG. 8, the mobile terminal 100 may determine the source language (i.e., Korean (KR)) and the target language (i.e., English (EN)) for the voice "AAA (KR)" of the first speaker SPK1, and output the translation result for the voice "AAA (KR)" of the first speaker SPK1 in accordance with the determined source language and target language. For example, the translation result for the voice "AAA (KR)" may be data (e.g., voice data or text data) related to the voice "AAA (EN)" expressed in English (EN). Meanwhile, although it is illustrated in FIG. 8 that the target language for the voice "AAA (KR)" is English (EN), the embodiments of the present disclosure is not limited thereto.

As described above, since the mobile terminal 100 provides the translations based on the separated voice signals related to the voices of the speakers SPK1 to SPK4, the mobile terminal 100 has the effect of being able to output the translation result for the voice of a specific speaker.

In the same manner, the mobile terminal 100 may determine the source language (i.e., English (EN)) and the target language (i.e., Korean (KR)) for the voice "BBB (EN)" of the second speaker SPK2, and output the translation result for the voice "BBB (EN)" of the second speaker SPK2 in accordance with the determined source language and target language. Further, the mobile terminal 100 may also output the translation results for the voice "CCC (CN)" of the third speaker SPK3 and the voice "DDD (JP)" of the fourth speaker SPK4.

FIG. 9 is a flowchart illustrating a method for providing translation results by a mobile terminal according to embodiments of the present disclosure. An operation method of a mobile terminal to be explained with reference to FIG. 9 may be implemented as an application (e.g., voice separation application) which is stored in a non-temporary storage medium, and is executable by a computing device. For example, the processor 130 may execute an application stored in the memory 140, and perform operations corresponding to instructions indicating specific operations in accordance with the execution of the application.

Referring to FIG. 9, the mobile terminal 100 may generate the separated voice signals related to the voices of the respective speakers SPK1 to SPK4 (S210). According to embodiment, the mobile terminal may generate the separated voice signals by separating the voice signals generated in response to the voices based on the voice source positions of the voices.

The mobile terminal 100 may determine the source languages for translating the voices of the respective speakers SPK1 to SPK4 (S220). According to embodiments, the mobile terminal 100 may determine the source languages for translating the voices of the respective speakers SPK1 to SPK4 based on the voice source positions of the voices of the respective speakers SPK1 to SPK4. Further, the mobile terminal 100 may determine the target languages in which the voices of the respective speakers SPK1 to SPK4 are to be translated based on the voice source positions of the voices of the respective speakers SPK1 to SPK4.

The mobile terminal 100 may output the translation results for the voices of the respective speakers SPK1 to SPK4 in accordance with the source languages by using the separated voice signals (S230). According to embodiments, the mobile terminal 100 may output the translation results for the voices of the respective speakers SPK1 to SPK4 from the source languages to the target languages based on the determined source languages (and target languages).

The mobile terminal 100 according to embodiments of the present disclosure may generate the separated voice signals related to the voices of the respective speakers SPK1 to SPK4 by generating and processing the voice signals related to the voices of the speakers SPK1 to SPK4.

Further, the mobile terminal 100 according to embodiments of the present disclosure may translate the voices of the speakers SPK1 to SPK4 by using the separated voice signals, and output the translation results. Accordingly, even if the speakers SPK1 to SPK4 use different languages, they can pronounce the voices in their own languages, and translate the voices of the speakers who use the different languages in their own languages.

Generally, in order to perform processing of the voice signals, hardware, such as the microphone and the processor configured to process the voice signals, is required. Meanwhile, since the mobile terminal, such as a smartphone, basically includes the loudspeaker and the processor, users can perform the method according to embodiments of the present disclosure by using the mobile terminal 100, and thus the mobile terminal 100 has the effect of being able to separate the voices of the speakers even without preparing the separate hardware and to provide the translations for the voices by using the separated voices.

As described above, although embodiments have been described by the limited embodiments and drawings, those of ordinary skill in the corresponding technical field can make various corrections and modifications from the above description. For example, proper results can be achieved even if the described technologies are performed in a different order from that of the described method, and/or the described constituent elements, such as the system, structure, device, and circuit, are combined or assembled in a different form from that of the described method, or replaced by or substituted with other constituent elements or equivalents.

Accordingly, other implementations, other embodiments, and equivalents to the claims belong to the scope of the claims to be described later.

INDUSTRIAL APPLICABILITY

Embodiments of the present disclosure relate to a mobile terminal capable of processing voices and an operation method thereof.

The invention claimed is:

1. A mobile terminal comprising:
   a microphone comprising a plurality of microphones disposed to form an array, wherein the plurality of microphones are configured to generate a plurality of voice signals in response to voices of speakers;
   a processor configured to judge respective voice source positions of the voices based on a time delay among the plurality of voice signals generated from the plurality of microphones, wherein the respective voice source positions represent relative positions of the voices with respect to the mobile terminal, generate separated voice signals related to the respective voices by performing voice source separation of the voice signals based on the judged respective voice source positions of the voices, and output translation results for the respective voices based on the separated voice signals; and
   a memory configured to store voice source position information representing positions of respective speakers and source language information representing information on source languages that are pronounced languages of the respective speakers, the source language information corresponding to the relative positions of the respective speakers with respect to the mobile terminal,
   wherein the processor is configured to output the translation results in which the languages of the voices of the speakers have been translated from the source languages into target languages to be translated based on the source language information and the separated voice signals,
   wherein the processor is configured to:
   determine the source languages corresponding to the relative positions of the voices based on the voice source position information and the source language information by comparing the judged respective voice source positions of the voices with position information included in the voice source position information to identify the respective speakers and determining the source languages corresponding to the respective speakers included in the source language information,
   read the determined source language information corresponding to the relative positions of the voices, and output the translation results for the respective voices in accordance with the determined source languages.

2. The mobile terminal of claim 1, further comprising a display configured to visually output the translation results.

3. The mobile terminal of claim 1, wherein the processor is configured to: generate voice source position information representing the voice source positions of the respective voices based on the time delay among the plurality of voice signals generated from the plurality of microphones, and match and store, in the memory, the voice source position information for the voices with the separated voice signals for the voices.

4. The mobile terminal of claim 1, further comprising a communication device configured to communicate with an external device,
   wherein the communication device is configured to transmit the translation results output by the processor to the external device.

5. An operation method of a mobile terminal capable of processing voices, the operation method comprising:
   generating, by a plurality of microphones disposed to form an array, a plurality of voice signals in response to voices of speakers;
   judging respective voice source positions of the voices based on a time delay among the plurality of voice signals generated from the plurality of microphones, wherein the respective voice source positions represent relative positions of the voices with respect to the mobile terminal;

performing voice source separation of the voice signals based on the judged respective voice source positions of the voices;

generating separated voice signals related to the respective voices in accordance with the result of the voice source separation; and outputting translation results for the respective voices based on the separated voice signals, wherein the outputting of the translation results includes:

storing voice source position information representing positions of respective speakers and source language information representing information on source languages that are pronounced languages of the respective speakers, the source language information corresponding to the relative positions of each of the respective speakers with respect to the mobile terminal; and outputting the translation results in which the languages of the voices of the speakers have been translated from the source languages into target languages that are languages to be translated based on the source language information and the separated voice signals, wherein the outputting of the translation results comprises:

determining the source languages corresponding to the relative positions of the voices based on the voice source position information and the source language information by comparing the judged respective voice source positions of the voices with position information included in the voice source position information to identify the respective speakers and determining the source languages corresponding to the respective speakers included in the source language information, reading the determined source language information corresponding to the relative positions of the voices, and outputting the translation results for the respective voices in accordance with the determined source languages.

6. The operation method of claim 5, further comprising:

generating voice source position information representing the voice source positions of the respective voices based on the time delay among the plurality of voice signals generated from the plurality of microphones; and matching and storing the voice source position information for the voices with the separated voice signals for the voices.

\* \* \* \* \*